US012607465B2

(12) United States Patent
Delaune et al.

(10) Patent No.: US 12,607,465 B2

(45) Date of Patent: Apr. 21, 2026

(54) MINIMAL STATE AUGMENTATION ALGORITHM FOR STEREO-VISION-BASED NAVIGATION

(71) Applicant: California Institute of Technology, Pasadena, CA (US)

(72) Inventors: Jeff H. Delaune, Pasadena, CA (US); Roland Brockers, Pasadena, CA (US); Robert A. Hewitt, Tujunga, CA (US); David S. Bayard, Glendale, CA (US); Alejandro M. San Martin, San Gabriel, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 13 days.

(21) Appl. No.: 18/778,787

(22) Filed: Jul. 19, 2024

(65) Prior Publication Data

US 2025/0027777 A1     Jan. 23, 2025

Related U.S. Application Data

(60) Provisional application No. 63/527,646, filed on Jul. 19, 2023.

(51) Int. Cl.
| | |
|---|---|
| *G01C 21/28* | (2006.01) |
| *G06T 7/246* | (2017.01) |

(Continued)

(52) U.S. Cl.
CPC .............. *G01C 21/28* (2013.01); *G06T 7/248* (2017.01); *G06T 7/593* (2017.01); *G06T 7/74* (2017.01);

(Continued)

(58) Field of Classification Search
CPC ......... G01C 21/28; G06T 7/248; G06T 7/593; G06T 7/74; G06T 2207/10021; G06T 2207/30252
See application file for complete search history.

(56) References Cited

U.S. PATENT DOCUMENTS

| | | | |
|---|---|---|---|
| 11,181,379 B2 * | 11/2021 | Babu | ....................... G01S 17/66 |
| 2005/0234644 A1 * | 10/2005 | Lin | ...................... G01C 21/005 701/470 |

(Continued)

OTHER PUBLICATIONS

Bayard, D.S., et al., "Vision-Based Navigation for the NASA Mars Helicopter", AIAA SciTech Forum, Jan. 2019, pp. 1-22.

(Continued)

*Primary Examiner* — Hunter B Lonsberry
*Assistant Examiner* — Harrison Heflin
(74) *Attorney, Agent, or Firm* — Gates & Cooper LLP

(57) ABSTRACT

A method to perform vision based navigation on a moving vehicle. An image processor receives reference images with associated depth information as base frames or search frames. 2D features are detected in base frames and tracked in subsequent search frames. A new base frame is triggered when a number of features or a spatial distribution fall under thresholds. A depth processor reconstructs the depth and 3D position of each of the 2D features. A track manager manages a feature list database mapping the 2D coordinates of each tracked 2D feature with the 3D coordinate of that feature. A state manager constructs a filter state vector with 15 error states propagated at an IMU rate and 6 additional error states corresponding to clones of pose states. A visual updater utilizes the tracked 2D feature coordinates to update the filter state vector. A filter forms residuals and corrects inertial error drift.

18 Claims, 15 Drawing Sheets

(51) Int. Cl.
  *G06T 7/593* (2017.01)
  *G06T 7/73* (2017.01)

(52) U.S. Cl.
  CPC ............... *G06T 2207/10021* (2013.01); *G06T 2207/30252* (2013.01)

(56) References Cited

U.S. PATENT DOCUMENTS

2017/0336220 A1*  11/2017  Broaddus ................ G06T 7/285
2019/0094388 A1*  3/2019  Görcke ................. G01C 19/34

OTHER PUBLICATIONS

Delaune, J., et al., "xVIO: A Range-Visual-Inertial Odometry Framework", Jet Propulsion Laboratory, California Institute of Technology, Oct. 2020, pp. 1-67, arXiv:2010.06677.

* cited by examiner

*New Base Frame*

*Time / Images*

*Time / Images*

ImageProc:
Stereo Image Callback

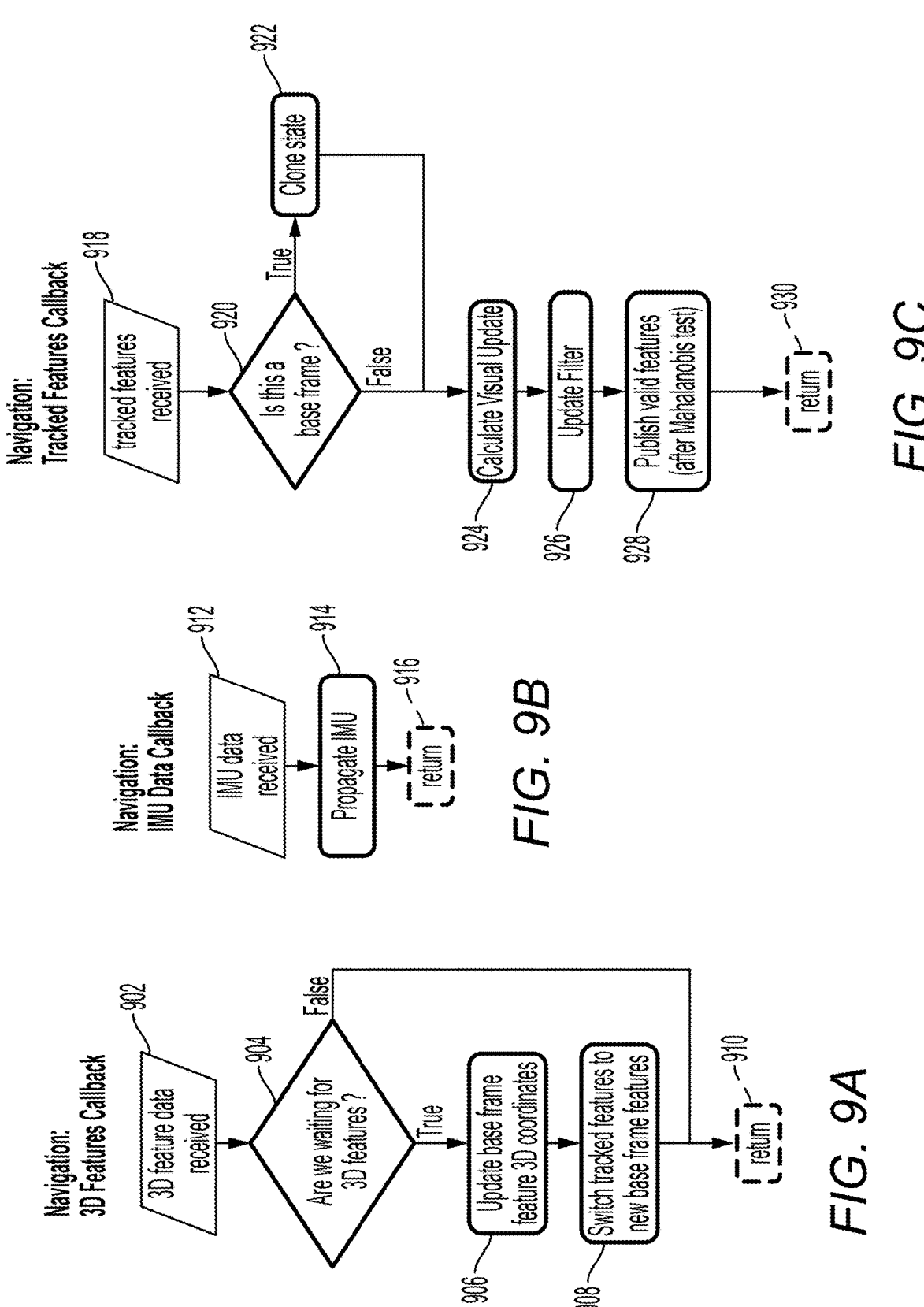

Navigation:
Tracked Features Callback tracked features received — 918

Is this a base frame ? — 920

True → Clone state — 922

False → Calculate Visual Update — 924 → Update Filter — 926 → Publish valid features (after Mahalanobis test) — 928 → [return] — 930

*FIG. 9C*

Navigation:
IMU Data Callback

IMU data received — 912 → Propagate IMU — 914 → [return] — 916

*FIG. 9B*

Navigation:
3D Features Callback

3D feature data received — 902

Are we waiting for 3D features? — 904

False

True → Update base frame feature 3D coordinates — 906 → Switch tracked features to new base frame features — 908 → [return] — 910

*FIG. 9A*

StereoProc:
3D Features Request Callback 3D feature calculation request received — 1002

Calculate 3D information from stereo pair for requested features — 1004

Undistort & normalize features — 1006

Publish 3D features — 1008 return — 1010

Receive Images with Depth Information — 1202

Detect 2D Features on a Reference Image — 1204

Trigger New Base Frame — 1206

Reconstruct 3D Feature Data — 1208

Track 2D Features on Search Frame — 1210

Manage Feature List Database — 1212

Utilize 3D Coordinates to Form Residuals — 1214

Construct Filter State Vector — 1216

Update Filter State Vector — 1218

Correct Inertial Error Drift — 1220

MINIMAL STATE AUGMENTATION ALGORITHM FOR STEREO-VISION-BASED NAVIGATION

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 63/527,646, filed on Jul. 19, 2023, with inventor(s) Jeff H. Delaune, Roland Brockers, Robert A. Hewitt, David S. Bayard, and Alejandro M. San Martin, entitled "Maven-Stereo: A Minimal State Augmentation Algorithm for Stereo-Vision-Based Navigation."

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

The present invention relates generally to robotic exploration, and in particular, to a method, apparatus, system, and article of manufacture for stereo-vision based navigation where global positioning satellite (GPS) location is unavailable or not accurate enough.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The National Aeronautics and Space Administration's (NASA's) Cooperative Autonomous Distributed Robotic Explorers (CADRE) mission is a network of shoe-box-sized mobile robots/rovers that will demonstrate autonomous robotic exploration of the moon in 2025, with potential applications to Mars and beyond. More specifically, CADRE is a flight technology demonstration to send (via a commercial lunar payload) a team of small multi-agent rovers to autonomously explore the daytime lunar environment and perform distributed measurements. The CADRE mission provides for a commercial lunar lander (CLPS) landing on the surface. Thereafter, the team of rovers are deployed and commissioned. The rovers perform an autonomous mission by transiting in formation and utilizing multi-hop communications to the CADRE base station on the lander. During the mission, the rovers cooperatively explore the lunar surface and build a lunar subsurface 3D map together. Distributed measurements are then integrated from all rovers and communicated back.

The CADRE mission utilizes a hierarchical autonomy approach with mission execution handled by a team level autonomy layer that includes strategic planning for top level team coordination (that provides each rover with a motion target). Further, each rover deploys its own GNC (guidance, navigation, and control) stack that includes a local pose estimation, local motion planning, and local mapping for obstacle avoidance.

In view of the above, while the robots/rovers will estimate their position and orientation (altogether called pose) with respect to each other and the lander at regular intervals, each individual robot is required to estimate its own position, velocity and orientation accurately in a terrain-relative frame for autonomous driving.

The (3-sigma) error requirements are of the order of 1% of the distance traveled in position, 1 cm/s in velocity, and 1 deg in orientation. To perform terrain-relative motion estimation, the CADRE robots can use up to two pairs of stereo cameras (one facing forward, one facing backward), an Inertial Measurement Unit (IMU), and a sun sensor.

However, one problem with CADRE and other prior art systems is that of providing real-time state estimation. This problem is extremely common in robotics, for planetary but also commercial applications. Stereo enables depth perception without requiring terrain topography assumptions or moving the camera, while the IMU enables the estimation of the orientation with respect to the gravity vector, and estimation higher frame rate.

State-of-the-art algorithms in research literature are tightly-coupled stereo-IMU Simulation Localization and Mapping (SLAM), which include each visual feature in the state vector of the estimator, resulting in large numerical complexity, large software runtime, high code complexity. The large runtime is problematic when there are multiple stereo cameras to be processed, other high-runtime autonomy algorithms (e.g., mapping) sharing the same processor, or the processor performance is limited.

State-of-the-art algorithms in spaceflight correspond to the stereo visual odometry used on the Mars rovers, loosely coupled with an IMU. It can run on very resource-limited space computers; however, it is not as accurate nor robust as tightly-coupled approaches. In this regard, prior art autonomous lunar rover VO (visual odometry) at TRL9 (technology readiness level 9—actual system "flight proven" through successful mission operations) drifts of the order of 54%. Based on such drift, the Mars TRL9 stereo VO is not expected to meet the CADRE requirements. Further, it is desirable to provide a solution that is closer to the state of the art in order to provide a low risk but potentially high-reward situation. In addition, it is desirable to use a filter-based estimator, instead of batch optimization, to minimize computational cost. For the filter update, one may consider 3D error vs. reprojection error vs. intensity error. R, reprojection error leads to improved accuracy and convergence compared to 3D error models. Using "direct" intensity error models is on par with the reprojection for accuracy but is computationally expensive and only relevant over feature-poor areas.

In view of the above, many prior art robotic applications navigate using stereo cameras. There is an objective to be as accurate and robust as modern research SLAM, while requiring only a fraction of the runtime to execute. The requirement for low processing might come from the limited performance of the on-board computer (like for the CADRE mission), or because many stereo cameras pair must be processed together in real time (e.g. for an autonomous car with camera pointing in all directions).

To overcome the problems of the prior art, it is desirable to provide real-time state estimation using one or multiple stereo cameras and an IMU. Embodiments of the invention provide such a solution that works with one or multiple stereo cameras, as an extension to the prior art MAVeN algorithm which flew the Ingenuity Mars Helicopter. The original MAVeN algorithm is described in [Bayard 2019].

Unlike the original MAVeN, embodiments of the present invention remove the need to have a 3D model of the terrain. This means that embodiments of the invention can operate in truly unknown environment, independently of the terrain/scene topography.

SUMMARY OF THE INVENTION

Embodiments of the invention drastically lower the runtime requirements to obtain state-of-the-art accuracy and robustness of tightly-coupled methods independently of terrain topography. Embodiments of the invention can even process an unlimited number of stereo pairs while still requiring only six extra filter error states for vision processing. This means the computational cost will grow linearly with the number of features, instead of cubic with traditional SLAM methods.

Embodiments of the invention provide the most efficient algorithm to do state estimation from more than two (2) cameras with overlapping field of view. This can have applications including but not limited to navigating any moving vehicle including:

all future ground or aerial mobility robot applications;
  autonomous driving;
  augmented/mixed/virtual reality headsets; and
  space navigation (rovers, helicopters, hoppers, in-orbit
    rendezvous, small body navigation).

BRIEF DESCRIPTION OF THE DRAWINGS

Referring now to the drawings in which like reference numbers represent corresponding parts throughout:

FIGS. 9A-9C illustrate the implementation logic of the navigation callback module response to the various input signals in accordance with one or more embodiments of the invention;

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention overcome the problems of the prior art by providing real-time state estimation using one or multiple stereo cameras and an IMU. As used herein, embodiments of the invention may be utilized with a variety of different types of cameras e.g., thermal cameras, lidar, light, radar, sonar, etc.

Embodiments of the invention (also referred to as MAVeN-stereo) is based on a tightly-coupled Extended Kalman Filter (EKF) estimator, which only requires six (6) extra error states to accommodate measurements of N visual features, instead of 3N error states with standard SLAM.

MAVeN-stereo further provides one or more of the following features:

[1] Creates features on the fly without requiring pre-
      mapped landmarks;
  [2] Reduces position and velocity error growth inherent to
      IMU-based state propagation;
  [3] Filter state is minimally augmented compared to
      competing algorithms such as SLAM;
  [4] Error growth remains reduced even under challenging
      vehicle motions;
  [5] Allows close-proximity operations over unknown and
      previously unseen surfaces;

However, unlike prior art systems (e.g., the initial MAVeN):

[6] MAVeN-stereo does NOT require to have a shape
      model of the terrain beforehand (assumption in [Bayard
      2019]);
  [7] MAVeN-stereo also does not require to have a lidar
      altimeter, or an inclinometer initial attitude knowledge
      (assumption in [Bayard 2019]);
  [8] The only assumptions done by MAVeN stereo are that
      there is a second camera available to perform stereo
      measurements and that there is no noise on the feature
      depth measured by the two cameras using stereo. The
      benefits of this is to enable the MAVeN principles to be
      applied to any environment, whether it is flat or 3D, as
      long as it is within stereo range.

Principles of Operation

Figure 1:
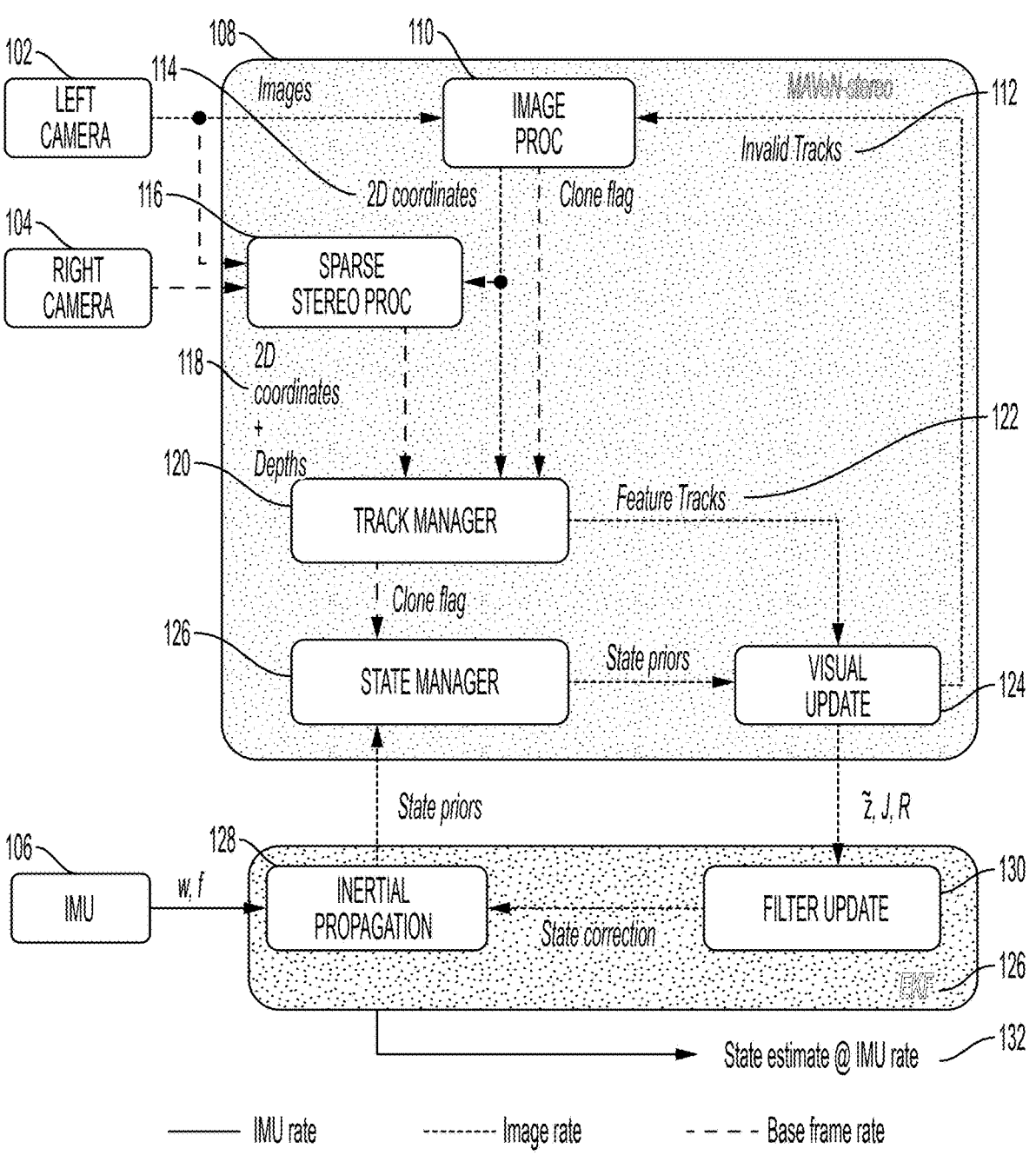
FIG. 1 illustrates an architectural diagram of one or more embodiments of the invention.

FIG. 1 illustrates an architectural diagram of one or more embodiments of the invention. As illustrated, embodiments of the invention include at least three sensors to operate (left stereo camera 102, right camera 104, and an IMU 106), but the implementation details here are valid for extensions up to an unlimited number of camera stereo pairs (i.e., each stereo pair comprises a left camera 102 and a right camera

104). For instance, the CADRE mission used two stereo pairs (four [4] cameras) and an IMU 106.

Figure 2:
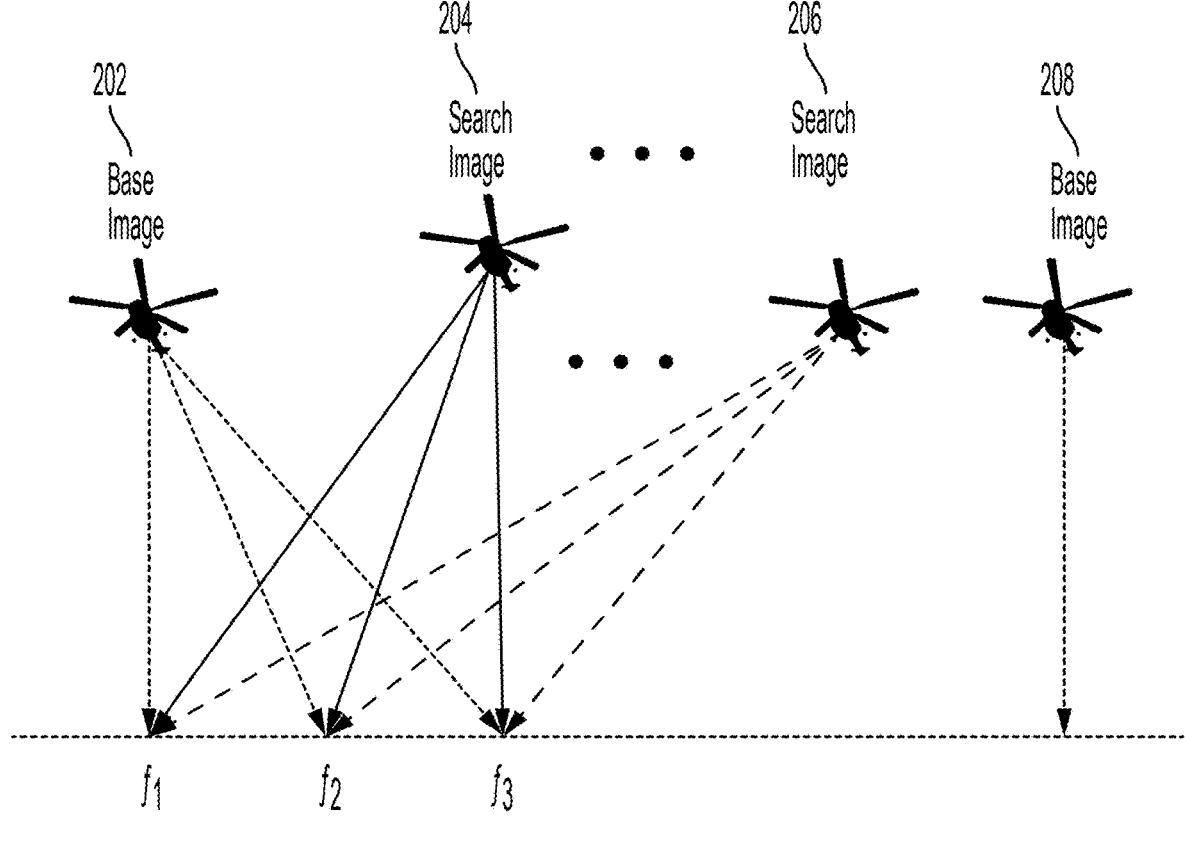
FIG. 2 illustrates base and search frames utilized in accordance with one or more embodiments of the invention.

Based on the sensor data, a series of images may be captured by each robot/rover. As set forth in [Bayard 2019], the depth of image features may be triangulated in a pair of stereo images (called base frame) to use as pseudo-landmarks for the next image (called search frames). This process is described in more detail with respect to FIG. 2 which illustrates base and search frames utilized in accordance with one or more embodiments of the invention. The processing sequence includes:

[1] Identify the first image as a Base image 202;

[2] Use the current estimate of a Base pose $p_B$, $q_B$ to map/triangulate features, e.g., $f_1$, $f_2$, $f_3$ in the Base image 202 in the world frame. These feature positions will serve as pseudo-landmarks (as used herein $p_B$, $q_B$ are the position and attitude quaternion which comprise the Base state);

[3] Identify the next image 204 as a Search image;

[4] Match Search image features to the pseudo-landmarks $f_1$, $f_2$, $f_3$ mapped from most recent Base image 202. Assume that there are m matches;

[5] Combine the m pseudo-landmark matches with current geometry to form a measurement that is a function of both the current Base and Search states, $y_i=h_i(p_S, q_S, p_B, q_B)+v_i$, i=1 . . . , m. Perform Kalman filter measurement and time updates (as used herein $p_S$, $q_S$ are the position ant attitude quaternion states which comprise the Search state);

[6] If the number of matched features drops below a threshold (or other relevant logic), declare the next image 208 as a new Base image and go to [1]. Otherwise declare the next image as a Search image 206 and go to [3]. Alternatively, the new Base image 208 may also be used simultaneously as a Search image 204-206 associated with the previous Base frame 202. This (intentional) overlap minimizes the drift incurred between Base frames 202 and 208 since it avoids a purely IMU-only period of integration.

Returning to FIG. 1, embodiments of the invention process both stereo disparity and feature tracking visual measurements. The feature two-dimensional (2D) coordinates as observed in one image (e.g., the left/reference image) are used at the image rate to update an IMU-propagated Kalman filter. The depth is computed at base frame rate and is used deterministically in the filter.

Further details of embodiments of the invention can be explained through five key functions:

Image processing
Sparse stereo processing
Track Manager
State Manager
Visual Update It may be noted that embodiments of the invention may be based on Extended Kalman Filter (EKF) propagation inertial dynamics, but could be implemented in other filter types (e.g., unscented Kalman filter). More details for the EKF technique referred to as xVIO can be found at [Delaune 2020]. However, compared to xVIO, embodiments of the invention achieve similar accuracy at a fraction of the computational cost. These differences are described in further detail below.

Image Processing 108

Figure 3A:
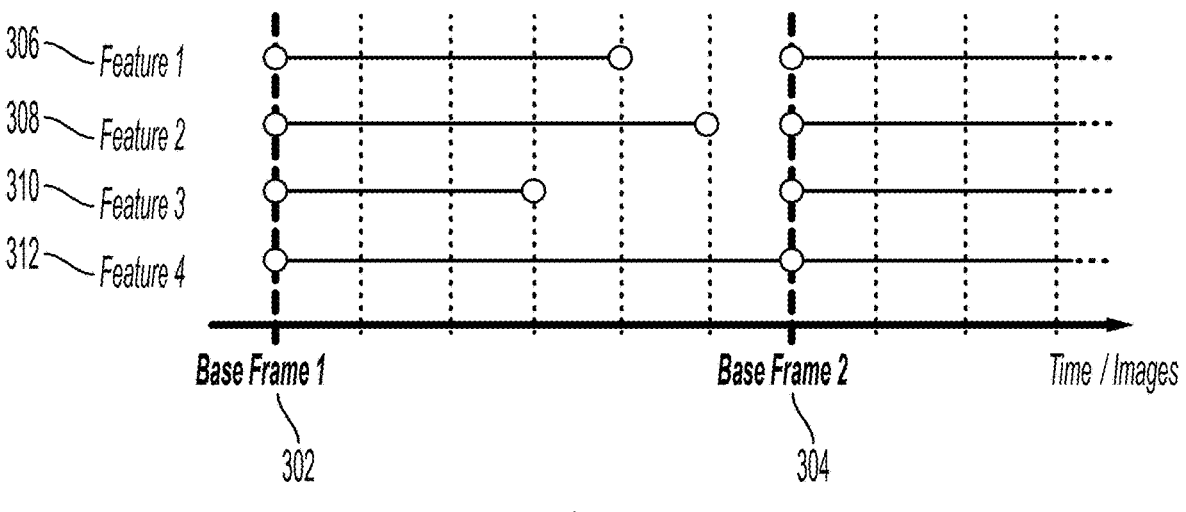
FIGS. 3A and 3B illustrate the feature management logic for representative MAVeN-stereo (FIG. 3A) and the Standard EKF-SLAM (FIG. 3B) in accordance with one or more embodiments of the invention.
Figure 3B:
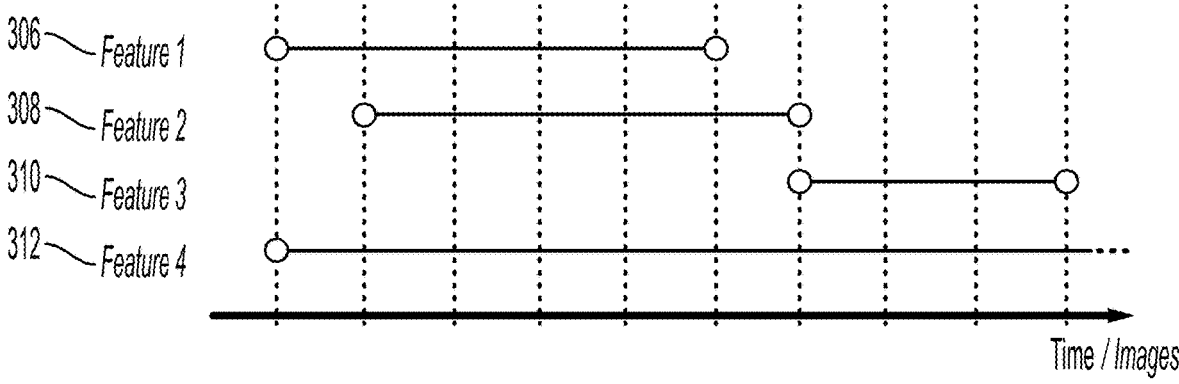

Referring to FIG. 1, the (reference) images 108 from the left (also referred to as "reference") camera 102 are processed via image processor 110. More specifically, embodiments of the invention (MAVeN-stereo) are based on the same base frame 202/208—search frame 204/206 as described above for image processing. FIGS. 3A and 3B illustrate the feature management logic for representative MAVeN-stereo (FIG. 3A) and the Standard EKF-SLAM (FIG. 3B). MAVeN-stereo respawns new tracks at so-called base frames 302-304, and tracks them in subsequent search frames until feature count and distribution thresholds are not met any more. In particular, in FIG. 3A, on base frames 302 and 304, new 2D features 306-312 (also referred to as 2D coordinates 114 in FIG. 1) are detected on the left/reference image, e.g. using the FAST (features from accelerated segment test) corner detection algorithm. These features 206-312 are subsequently tracked in search frames (e.g., using the Lukas Kanade algorithm). Feature tracks 306-312 are checked for outliers using the RANSAC algorithm. A new base frame 304 is triggered by the Image processing component if either the number or spatial distribution of features falls under threshold values.

Feature tracks 306-312 may become invalid (i.e., invalid tracks 112 of FIG. 1) because of image processing (e.g. tracking failure, feature moving out of the field of view, RANSAC failure) or because they are reported as inconsistent by the Visual Update block.

The base frame—search frame pattern is unlike most SLAM algorithms based on an EKF, where new feature tracks can be spawned at any given time (see FIG. 3B where there are no base frames that can be used to spawn new feature tracks).

In embodiments of the invention, the Lukas Kanade tracker can be optionally guided using inputs from gyroscopes to improve the initial guess about the feature location.

Sparse Stereo Processing 116

When a base frame image is triggered, the Image Processing components 110 sends the 2D coordinates 114 of the new features to the Sparse Stereo Processing components 116, which will compute the depth 118 of said features in the left/reference camera frame using a stereo-rectified version of the left/reference and right/corresponding images for each stereo pair.

Track Management/Manager 120

Maven-stereo's track manager 120 uses input from the stereo block 118 at base frame rate, and image processing 110 at image rate, to manage a feature list database (i.e., feature tracks 122) where the 2D coordinates of each feature in a base frame is associated to the 3D coordinate of that feature in the base frame. This database is used to construct the MAVeN-stereo visual update 124 to the EKF explained below.

It is important to note that, unlike SLAM, the 3D coordinates of the features in the camera frame are stored in memory but not included in the state vector of the EKF.

State Manager 126

MAVeN-stereo EKF state vector is constructed as: $x=[x_I^T, x_V^T]^T$, where $x_I=[p^T,v^T,q^T,b_g^T,b_a^T]^T$ are the 16 inertial states (equivalently, 15 error states) propagated at IMU rate with $$\dot{p} = v$$

$$\dot{v} = C(q)^T(a_{IMU} - b_a - n_a) + g$$

$$\dot{q} = \frac{1}{2}\Omega(\omega_{IMU} - b_g - n_g)$$

$$\dot{b}_g = n_{b_g}$$

$$\dot{b}_a = n_{b_a}$$

7

8

With p, v, and q the position, velocity and orientation quaternion with respect to a terrain frame, $b_g$ and $b_a$ the gyroscope and accelerometer biases, and $\Omega$ the cross product matrix of the rate vector $x_V$ are the 7 vision states (equivalently, 6 error states) updated only at image rate.

On top of the standard 15 error state used by inertial-dynamics EKFs, MAVeN-stereo only requires 6 additional error states (3 for position, 3 for orientation) to be added and corresponding to clones of the pose states at the time of the current base frame. The 6 extra states are the only additional states needed to construct the MAVen-stereo visual update.

Figure 4A:
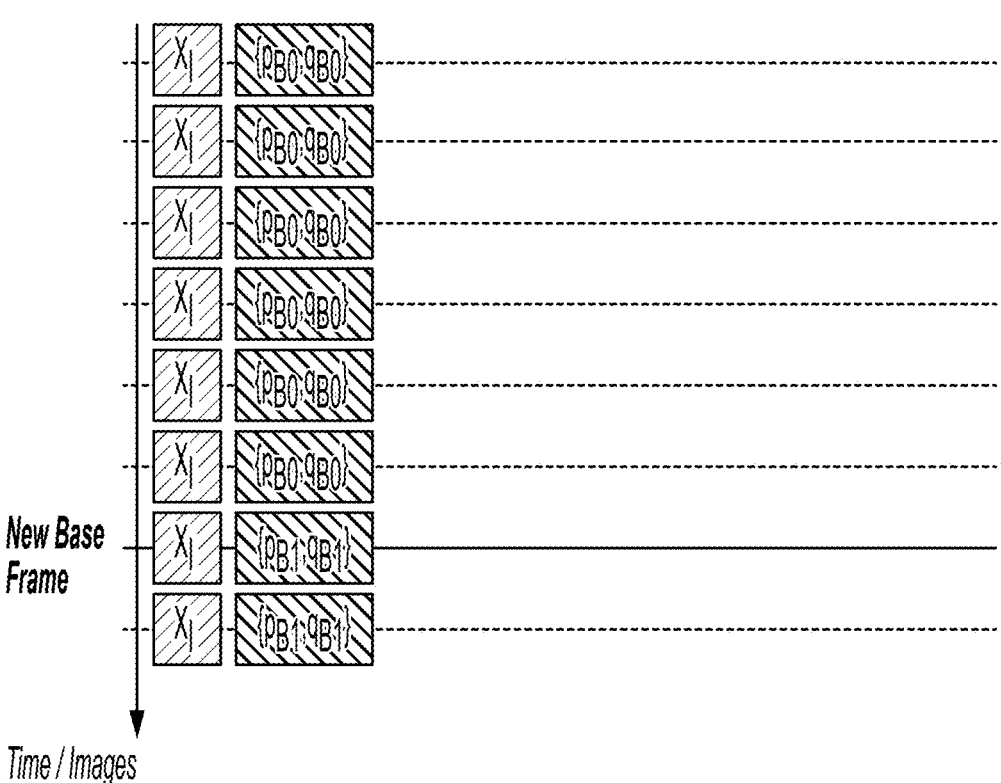
FIGS. 4A and 4B illustrate the statement management logic for representative MAVeN-stereo (FIG. 4A) and EKF-SLAM (FIG. 4B) in accordance with one or more embodiments of the invention.
Figure 4B:
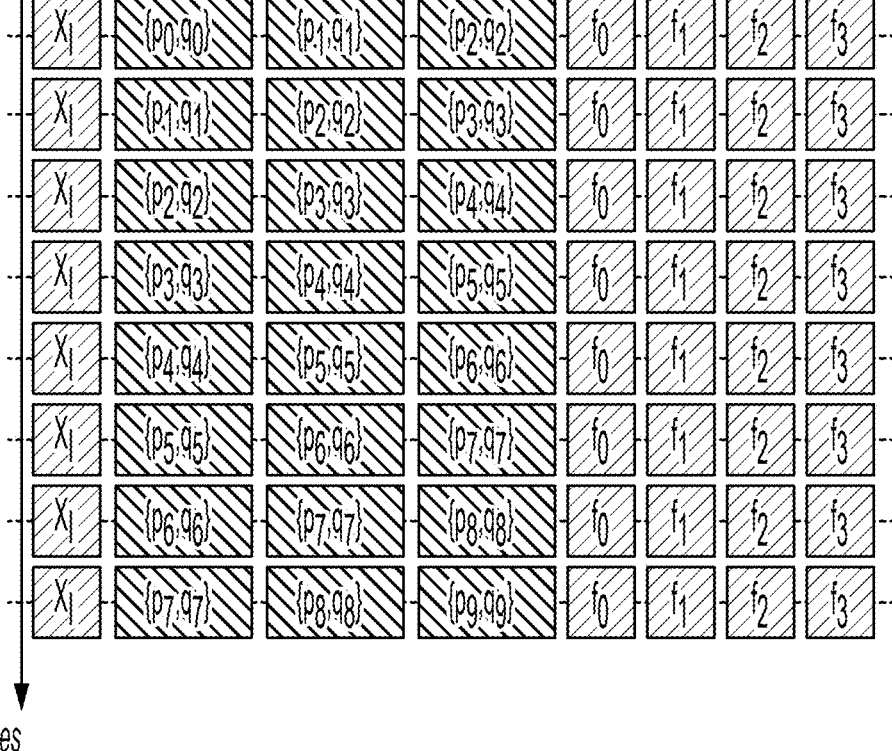

FIGS. 4A and 4B illustrate the statement management logic for representative MAVeN-stereo (FIG. 4A) and EKF-SLAM (FIG. 4B) in accordance with one or more embodiments of the invention. As illustrated, MAVeN-stereo only requires 21 states, independently of the number of features being tracked. In other words, the 21-state filter is independent of the number of the stereo cameras used for updates (i.e., even if there are 1000 cameras, only 21 states will be required). This is unlike other tightly-coupled EKF-SLAM formulations, which require a sliding window of camera poses (6 states per camera pose, in general at least 10 camera poses required) and/or each feature (3 extra states per feature, in general tens of features required), as illustrated in FIG. 4B. Overall, this reduces the size of the state vector by a factor of 10 which, given the cubic complexity of EKFs, reduces the computational cost of the filter by ~1000. Further, the base frame states are replaced by a clone of the current pose states at each new base frame, until operations end.

Visual Update 124

Figure 5:
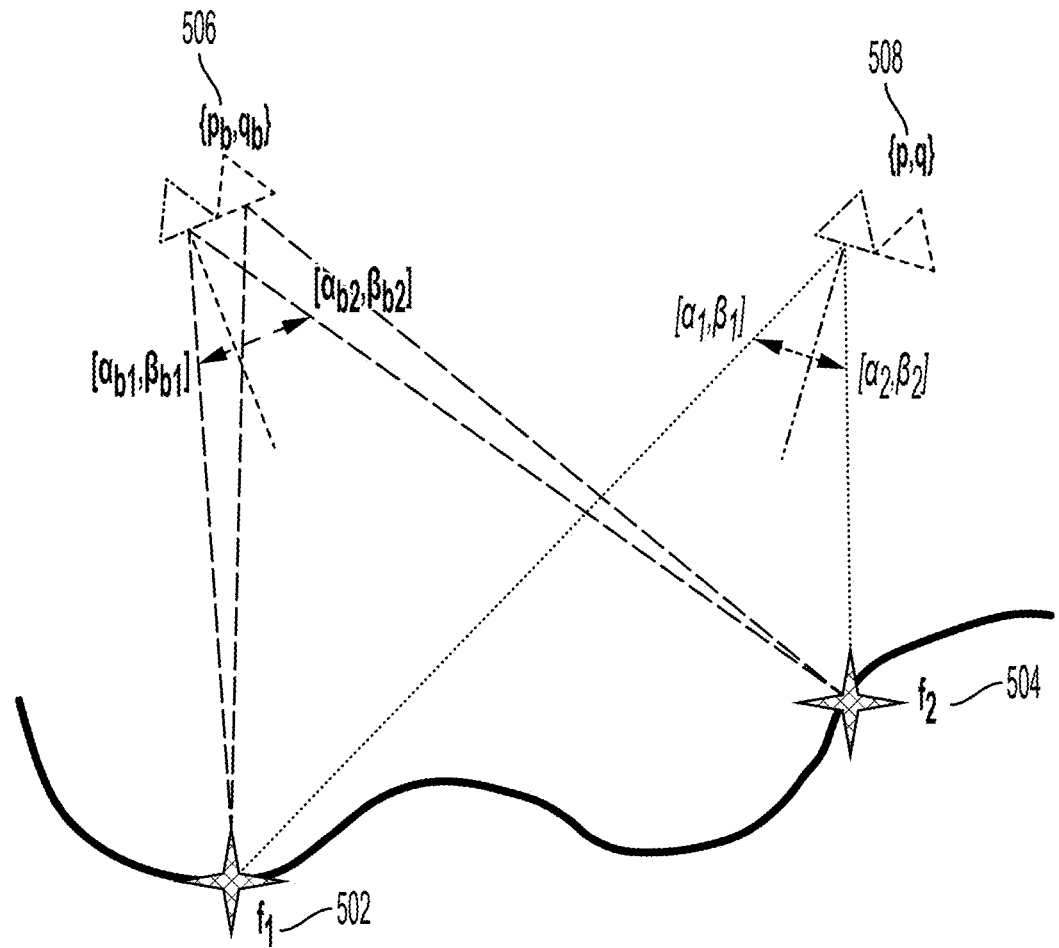
FIG. 5 illustrates the geometry of the MAVeN-stereo visual update in accordance with one or more embodiments of the invention.

FIG. 5 illustrates the geometry of the MAVeN-stereo visual update 124 in accordance with one or more embodiments of the invention. Features $f_1$ 502 and $f_2$ 504 are being tracked between the base frame at camera pose $\{p_b, q_b\}$ 506 and the current search frame with camera pose $\{p, q\}$ 508.

The measurements used in MAVeN-stereo are the 2D coordinates 114 of each feature in a search frame. For a general feature j, assuming:

the feature was measured at coordinates $[\alpha_{b,j}, \beta_{b,j}]$ (normalized coordinates) in a base frame;

the feature inverse depth $\{\rho_{b,j}\}$ computed from stereo disparity;

then the feature 3D coordinates in the terrain frame can be expressed as a function of the 21-state vector as:

$$f_j = p_b + \frac{1}{\rho_{b,j}} C(q_b)^T \begin{bmatrix} \alpha_{b,j} \\ \beta_{b,j} \\ 1 \end{bmatrix}$$

Where $\{p_b, q_b\}$ 506 are the camera poses in the terrain frame at base frame, as computed from MAVeN-stereo's extra clone states.

Since the 3D coordinates of each feature can be expressed as a function of the MAVeN-stereo state, the projected 2D measurements can also be expressed as a function of the MAVeN-stereo state which are then used for the EKF update 126. The 3D coordinates of the features measured in the base frame are used to form residuals for an EKF update 126 to correct the inertial error drift. In other words, the data from the IMU 106 (angular rates w, and specific force f), are used by the EKF update 126 to determine the inertial propagation 128. Further, the measurement residuals 2, jacobian matrix J, and covariance matrix R from the visual update 124 are utilized to update the filter 130 and provide the state correction (hereby correcting the inertial error drift) that is also used by the inertial propagation unit 128. The output from the EKF update 126 is the state estimate 132 at the IMU rate.

In view of the above, the following differences between xVIO and MAVeN may be demonstrated:

| Trade | xVIO-disparity | MAVeN-stereo | Consequence |
|---|---|---|---|
| Error Modeling | Extended | Limited | Smaller theoretical error with xVIO |
| Numerical complexity $C=O(n^3)$ | Large | Small | Lower runtime with MAVeN |
| Code complexity | High | Low | MAVeN easier to troubleshoot |

As can be seen in the above table, there is theoretically a smaller error with xVIO because of its improved modeling and the absence of the assumption on the stereo depth error. However, in practice this assumption does not lead to significant observable error when using the reprojection error to update the filter. On top of that, the numerical complexity results in lower runtime with MAVeN and for code complexity, MAVeN is easier to implement and diagnose. Therefore, MAVeN-stereo leads to errors as good as xVIO, without requiring the high computational cost and while being simpler to troubleshoot.

In addition, it may be noted that in the prior art, depth estimation is utilized and consumes significant computing power while constantly estimating the depth (consuming additional computing resources). In contrast, embodiments of the invention triangulate the location based on the stereo images and install it in memory independent of the estimation algorithm. In this regard, embodiments of the invention trust 3D information coming from the camera instead of trying to estimate the depth and the depth info is only computed when a base frame is triggered. As described herein, when the number of features drop too low or the spatial distribution of the features are too large, a new base frame is triggered (and hence the determination of depth/3D information). In this regard, embodiments of the invention have determined that the error related to 3D depth is only significant for points that are very far away (i.e., exceed a distance threshold) and by the time a point comes close, MAVeN-stereo has switched to a new base frame and as such, the effect of the error is never observed when reprojected for update.

Implementation Details

Figure 6:
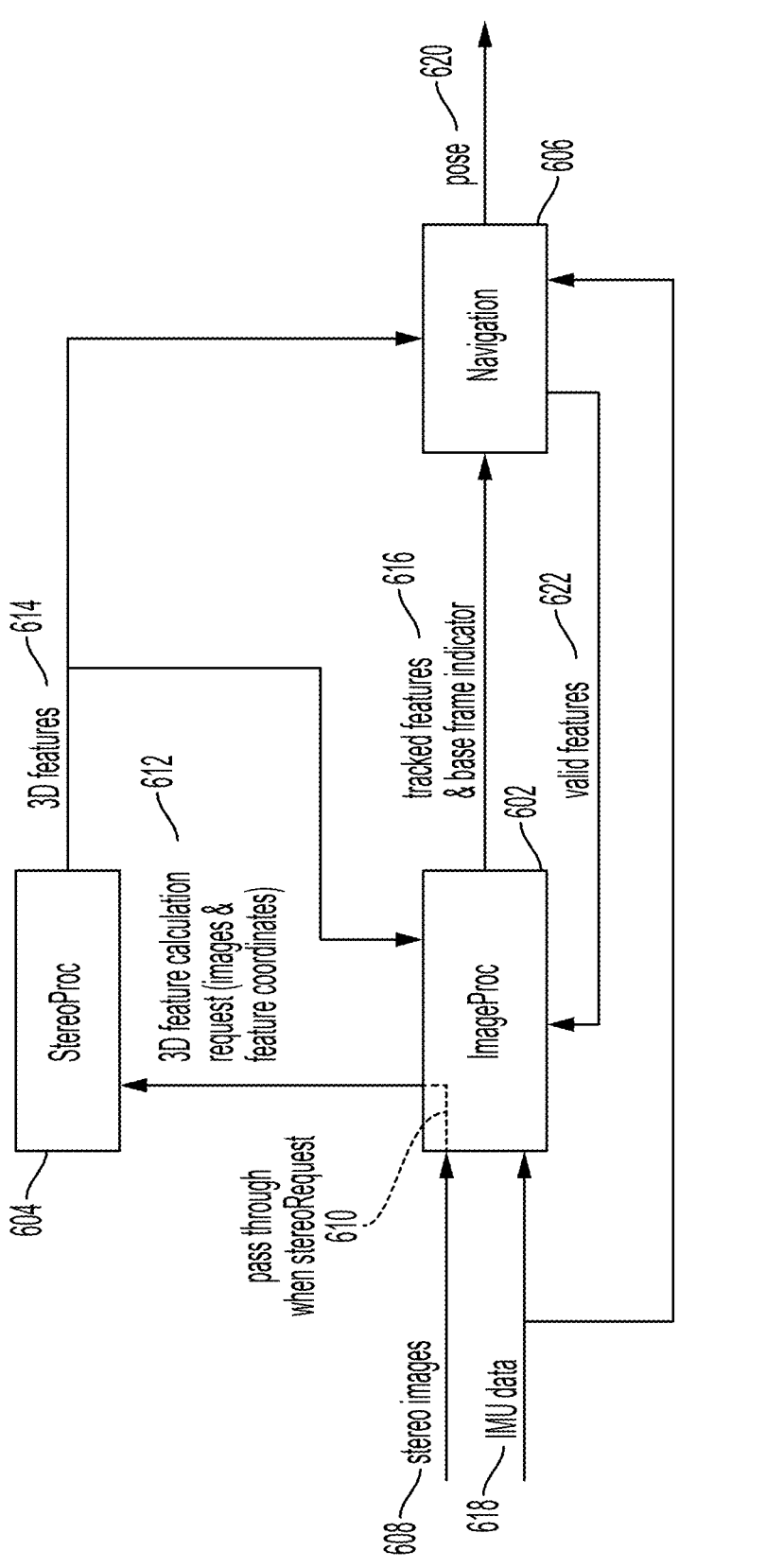
FIG. 6 illustrates a C++ software implementation of MAVeN-stereo in accordance with one or more embodiments of the invention.

MAVeN-stereo has been implemented in C++ in three different programs executing in parallel and called ImageProc, StereoProc, and Navigation. In this regard, FIG. 6 illustrates a C++ software implementation of MAVeN-stereo in accordance with one or more embodiments of the invention. As illustrated, the process is divided into three separate processes: Imageproc 602, StereoProc 604, and Navigation 606.

Compared to FIG. 1, ImageProc 602 is the implementation of the image processing 110, StereoProc 604 is an implementation of sparse stereo processing 116, while Navigation 606 includes all of the other blocks: state manager 126, track manager 120, update 124 and EKF 126.

In ImageProc 602, two trackers are running for each stereo pair 608. With a stereo request 610, the pair of stereo images 608 are passed through ImageProc 602 to StereoProc 604. In this regard, the ImageProc 602 requests 612 the 3D feature calculation from StereoProc 604 and receives the 3D features 614 in response. ImageProc 602 then provides the tracked features and the base frame indicator 616 to Navigation 606 which (based on IMU data 618 and the tracked features and base frame indicator 616) updates the pose 620. Further the navigation 606 also identifies invalid features 622 based on statistical consistency which are signaled to ImageProc 602.

This way, MAVeN-stereo can keep updating the pose 620 of the camera using Tracker 1, while the stereo disparities are being computed (i.e., in StereoProc 604) for the features being tracked by Tracker 2. Both trackers reside within the ImageProc module 602. This enables high-frame rate processing on low-performance computers.

In this configuration, one may use two sets of clone states: one for the active base frame, and one for the base frame that is being computed. This would result in a 27-error state filter, independently of the number of stereo pairs 608 being used. The active base frame clone state is used inside Navigation 606 after receiving the clone flag from ImageProc 602. Activation of the cloned state as the active base frame happens when Navigation 606 receives the 3D feature depths 614 computed by StereoProc 604.

FIGS. 7A-7D illustrate the 2-tracker logic for image processing 602 to keep tracking features on active base frames while stereo disparities are being computed for the next base frame in accordance with one or more embodiments of the invention. The overall flow through the steps of FIGS. 7A-7D are illustrated in FIGS. 8A and 8B. More specifically, FIGS. 8A and 8B are flow diagrams illustrating the parallel execution and messages between the ImageProc 602, StereoProc 604, and Navigation 606 programs, as part of embodiments of the invention. Note that the steps of FIG. 7A may only be needed if the computational time needed for stereo is significant compared to the frame interval period.

Figure 7A:
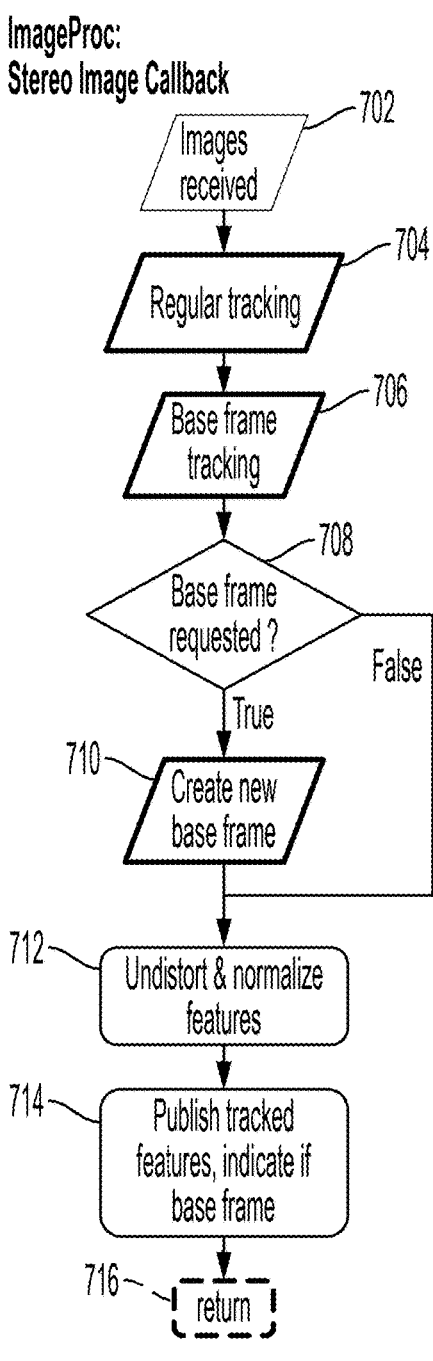
FIG. 7A-7D illustrate the 2-tracker logic for image processing to keep tracking features on active base frames while stereo disparities are being computed for the next base frame in accordance with one or more embodiments of the invention.
Figure 8A:
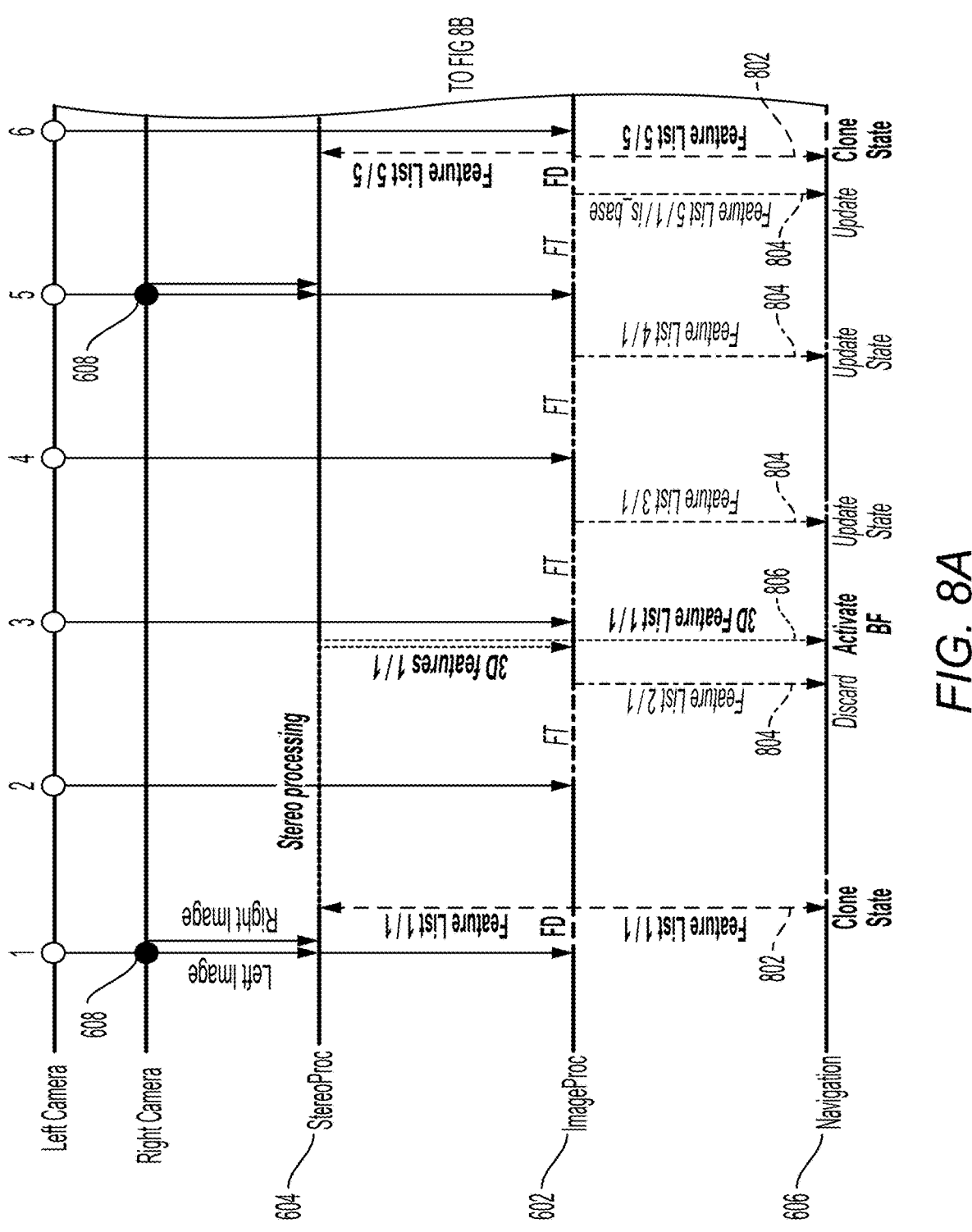
FIGS. 8A and 8B are flow diagrams illustrating the parallel execution and messages between components of the invention.
Figure 8B:
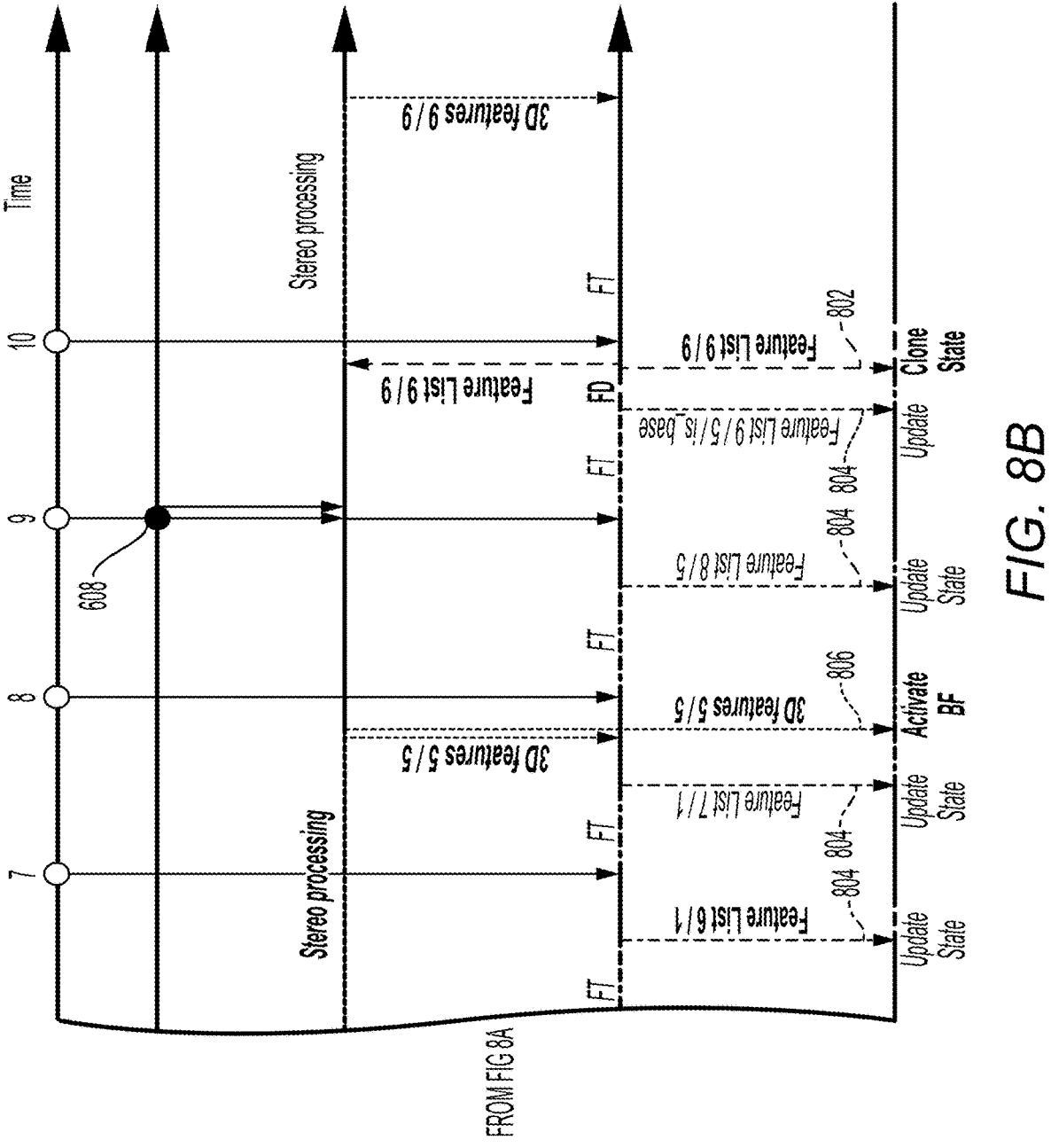

FIG. 7A details the overall logic for image processing 602. At 702, stereo images 608 are received. At 704, regular tracking is performed and at 706 base frame tracking is performed. At 708 a determination is made regarding whether a base frame has been requested. If a base frame has been requested, a new base frame is created at 710. If a base frame has not been requested (or after the new base frame has been created at 710), the features are undistorted and normalized at step 712. At 714, the tracked features are published along with an indication of whether it is a base frame. The process returns the results at 716.

Figure 7B:
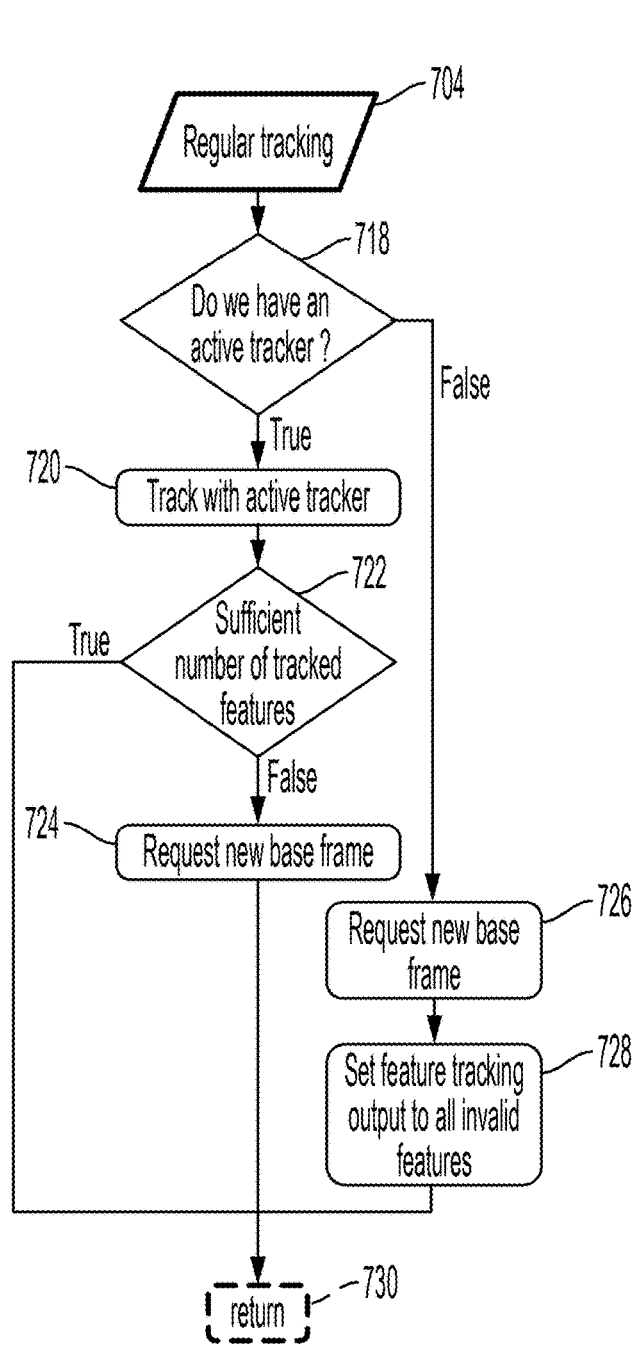

FIG. 7B illustrates the details for the regular tracking 704. At 718, a determination is made regarding whether there is an active tracker. If there is an active tracker, tracking is performed with the active tracker at step 720. At step 722, a determination is made regarding whether a sufficient number of features have been tracked. If not, a new base frame is requested at step 724. However, if there are a sufficient number of tracked features, the regular tracking is complete and the features are returned at step 730. If there is not an active tracker (as determined at step 718), a new base frame is requested at step 726, and the feature tracking output is set to all invalid features at step 728 before the process completes at step 730.

Figure 7C:
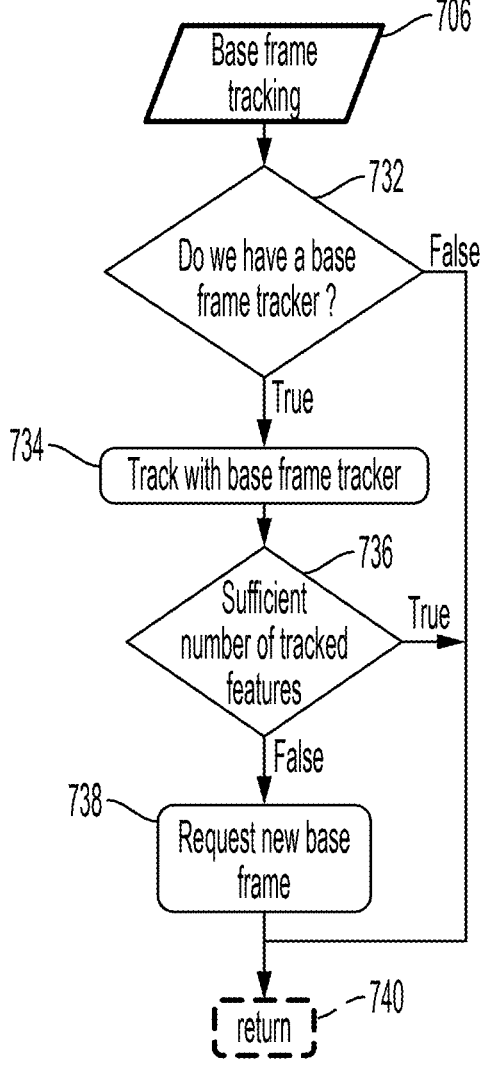

FIG. 7C illustrates base frame tracking details. At step 732, a determination is made regarding whether there is a base frame tracker. If not, the process is complete at step 740. If there is a base frame tracker, features are tracked with the base frame tracker at step 734. If a sufficient number of features have been tacked (as determined at step 736), the process is complete at step 740. However, if not enough features are tracked, a new base frame is requested at step 738.

Figure 7D:
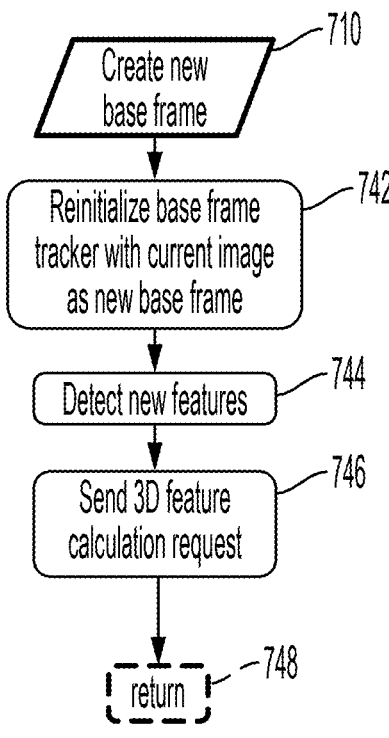

FIG. 7D illustrates the details for creating a new base frame. At step 742, the base frame tracker is reinitialized with the current image as the new base frame. At step 744, new features are detected. At step 746, a 3D feature calculation request is sent and the process is complete at step 748.

Referring now to FIGS. 8A-8B, the returned data from 716, 730, 740, and 748 is indicated at 802 (base frame) and 804 (search frame) and includes the feature list, timestamp, clone flag, sequence ID and sequence ID of the corresponding base frame, that are provided to the navigation program 606. StereoProc 704 also outputs data 806 which includes the depths of the base frame features. FIGS. 8A and 8B illustrated the parallel execution of the 3 software modules Navigation, ImageProc and StereoProc, and how the 2 ImageProc trackers allow for maintaining Navigation updates while the more computationally-demanding output of StereoProc is being computed.

FIGS. 9A-9C illustrate the implementation logic of the navigation call back module 606 response to the various input signals. Specifically, FIG. 9A illustrates the 3D features callback of the navigation module 606. The 3D feature data is received at 902 and checked at step 904. If the callback response is waiting for additional 3D features, the base frame 3D coordinates are updated at 906. At step 908 the tracked features are switched to the new base frame features. The process is complete at step 910.

FIG. 9B illustrates the IMU data callback performed by the navigation module 606. At step 912, the IMU data is received and the IMU is propagated at step 914. The process is complete at step 916.

FIG. 9C illustrates the tracked features callback performed by the navigation module 606. The tracked features are received at 918 and a determination is made at 920 regarding whether the frame is a base frame. If it is a base frame, the state is cloned at step 922. If it is not a base frame and/or after the state has been cloned, the visual update is calculated at step 924. The filter is updated at step 926 and the valid features are published (after a Mahalanobis test) at step 928. The process is complete at step 930.

Figure 10:
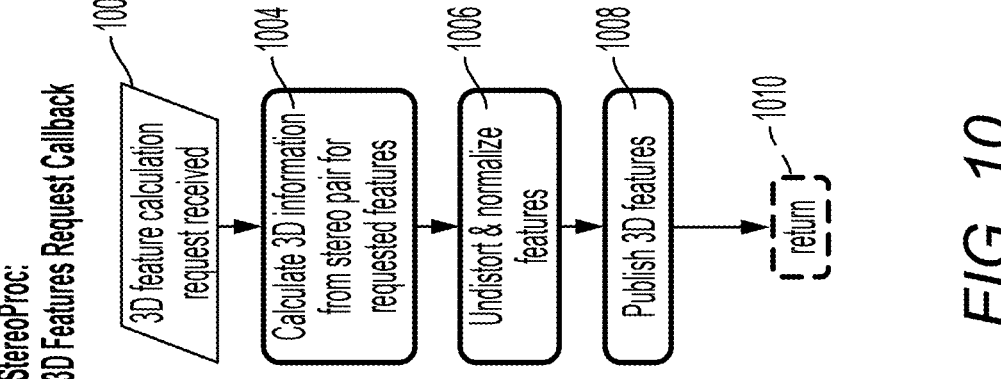
FIG. 10 illustrates the implementation logic for the StereoProc module callback response to its input signal in accordance with one or more embodiments of the invention.

FIG. 10 illustrates the implementation logic for the StereoProc module 604 call back response to its input signal. At step 1002, the 3D feature calculation request is received. At step 1004, the 3D information is calculated from the stereo pair for requested features. At step 1006, the features are undistorted and normalized. At step 1008, the 3D features are published and the process is complete at step 1010.

Figure 11C:
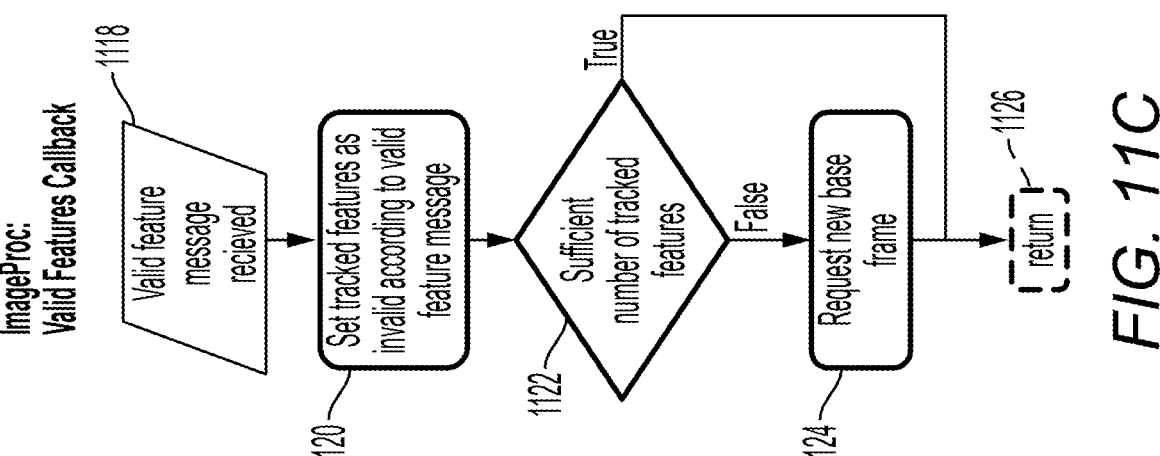
FIGS. 11A-11C illustrate the image processing's flow diagram for the response to signals being passed in accordance with one or more embodiments of the invention.
Figure 11B:
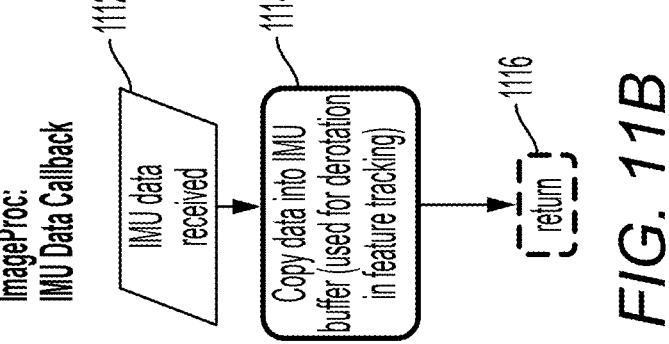
Figure 11A:
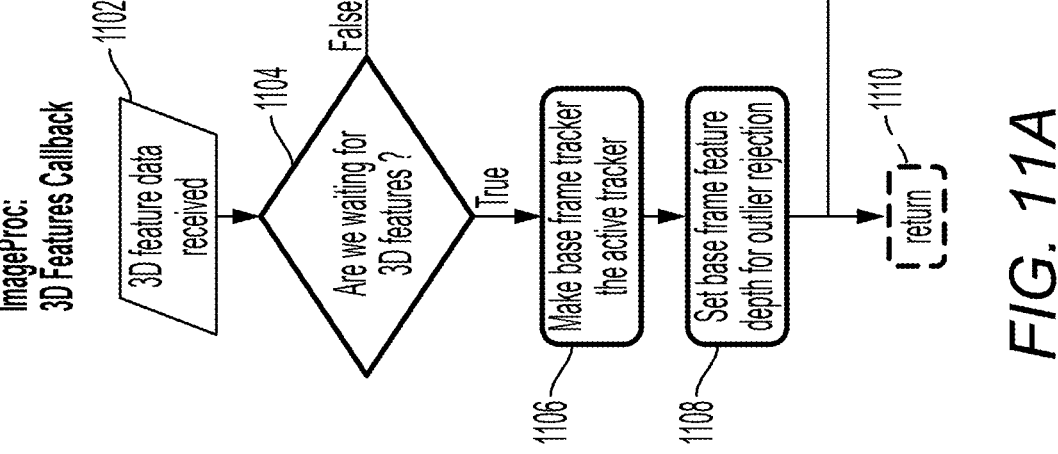

FIGS. 11A-11C illustrate the image processing's flow diagram for the response to signals being passed (e.g., the images 608 of FIG. 6). FIG. 11A illustrates the 3D features call back. At step 1102, 3D feature data is received and a determination is made at step 1104 whether we are waiting for more 3D features or not. If more 3D features are expected, the base frame tracker is made the active tracker at step 1106. At step 1108, the base frame feature depth is set for the outlier rejection and the process completes at step 1110.

FIG. 11B illustrates the IMU data callback process. At step 1112, the IMU data is received and at step 1114, the data is copied into an IMU buffer (used for derotation to help feature tracking during extreme rate motion). The process is complete at step 1116.

FIG. 11C illustrates the valid features callback process. At step 1118 the valid feature message is received. At step 1120, the tracked feature are set as invalid according to valid feature messages. At step 1122, a determination is made regarding whether there are a sufficient number of tracked features. If not, a new base frame is requested at step 1124.

If there are a sufficient number of tracked features, the process is complete at step 1126.

In view of the above, it may be noted that MAVeN-stereo has been implemented in C++ using JPL's (Jet Propulsion Laboratory's) X navigation framework. Its performance has been validated in simulation datasets, real datasets, and in real time running on-board the CADRE rover engineering models. In one or more embodiments, stereo is required at the base frame, but images from only one or both cameras can be used for search frame measurements.

Exemplary Use Cases/Applications

Embodiments of the invention may be utilized in any application that provides vision-based navigation solutions. For example, most robots use stereo cameras when they can. MAVeN-stereo delivers an accuracy/computational cost ratio that is superior to prior art methods for stereo-based motion estimation. For this reason, embodiments of the invention provide the capability to process images from multiple stereo pairs at the same time (for further accuracy or robustness) on the small processors available for some applications. For the same reason, MAVeN-stereo provides an optimal solution for a system having to integrate many stereo cameras (e.g. an autonomous with camera pairs pointing in all directions) at the highest frame rate possible.

Logical Flow

Figure 12:
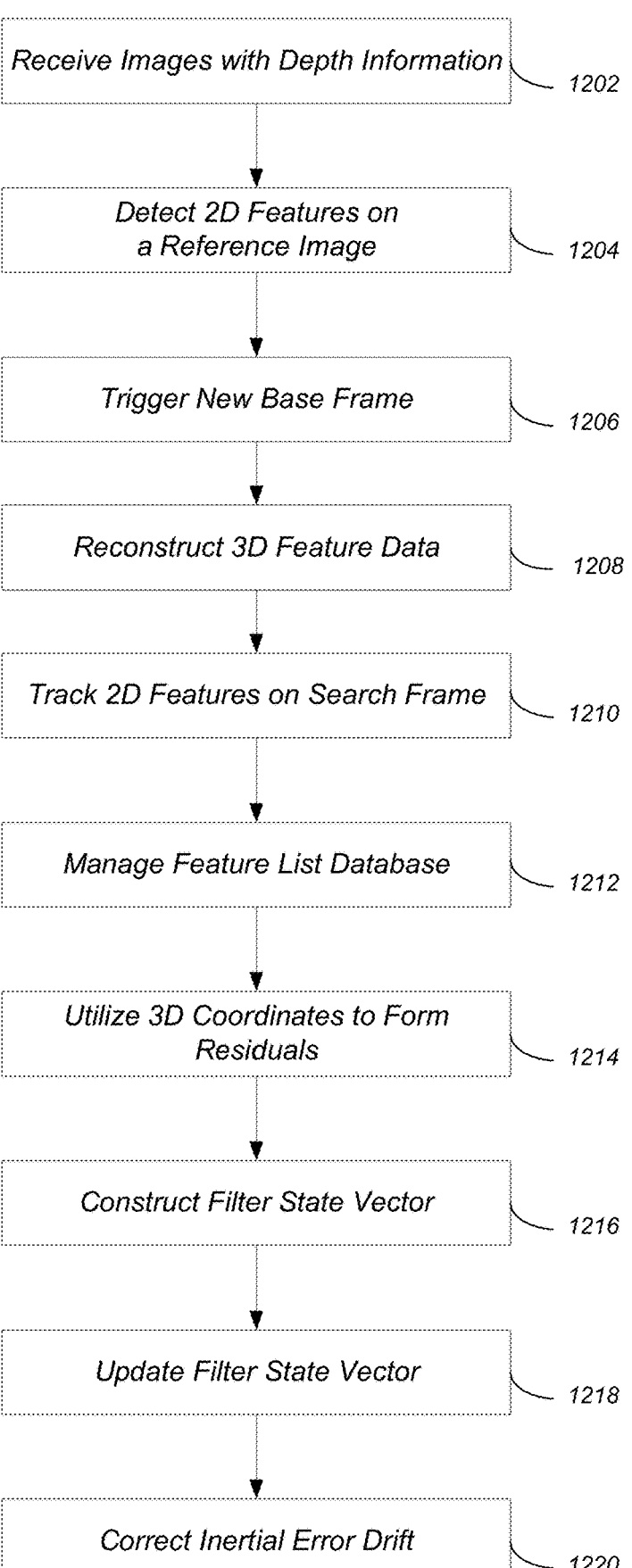
FIG. 12 illustrates the logical flow for vision based navigation of a moving vehicle in accordance with one or more embodiments of the invention.

FIG. 12 illustrates the general logical flow for vision based navigation on a moving vehicle in accordance with one or more embodiments of the invention. However, note that the sequence/order in which the steps are performed may differ than that illustrated. In particular, as noted above, some of the illustrated components/steps may be performed in parallel.

At step 1202, an image processor on the moving vehicle receives multiple reference images with associated depth information sequentially from one or more cameras of the moving vehicle. Each of the multiple reference images comprises a base frame or a search frame. Further to the above, in one or more embodiments of the invention, each of the multiple reference images with associated depth information is received from one or more stereo camera pairs.

At step 1204, one or more two-dimensional (2D) features are detected in a first base frame. In one or more embodiments a determination may be made that the depth can be calculated for a different camera at base frame rate generation. Based on such a determination, one of the multiple reference images may be switched to a different refence image from the different camera prior to detecting a next base frame. In other words, the reference view can be switched to a different camera before a base frame is generated IF the depth can be calculated for that different camera at base frame generation (e.g., if feature tracking on the previous reference frame degrades, as measured by a defined criteria).

At step 1206, a new base frame of the multiple reference images is triggered. Such a triggering occurs when: (1) a number of the one or more 2D features falls under a number threshold; or (2) a spatial distribution of the one or more 2D features falls under a spatial distribution threshold. Upon triggering the new base frame: (1) the detecting is repeated to detect one or more new 2D features; and (2) the 2D coordinates of the one or more new 2D features are sent to a depth processor.

In one or more embodiments, the detecting of the one or more new 2D features uses an interest point or a corner detection algorithm. In one or more embodiments, the triggering of the new base frame includes the cloning of the current position and orientation states into the 6 error static states.

At step 1208, a depth processor on the moving vehicle reconstructs the depth information and a 3D position of each of the one or more new 2D features (e.g., using a stereo-rectified version of each of the multiple reference images).

In one or more embodiments, the depth processor may utilize a sparse stereo algorithm. Alternatively, the depth processor may utilize a dense stereo algorithm that calculates range for every pixel of an image pair. In another embodiment, the depth processor may utilize a multi-view stereo algorithm that uses more than two (2) overlapping images to calculate range. Further, the depth processor may utilize a machine learning based ranging algorithm to calculate depth for each pixel (and/or for each of the one or more new 2D features). Further to the above, the first/second camera may be a single time-of-flight camera that provides an image and range for each pixel. Alternatively, the camera may be a single camera that provides an image and an additional range sensor that provides range for each pixel (e.g., lidar, sonar, etc.).

At step 1210, the one or more new 2D features are tracked in one or more subsequent search frames. In one or more embodiments, the tracking of the one or more new 2D features in the one or more subsequent search frames utilizes a Lukas Kanade algorithm or any other type of tracking algorithm. At step 1212, a track manager on the moving vehicle manages a feature list database wherein the 2D coordinates of each of the one or more new 2D features is associated with the 3D position of that feature based on the depth, and wherein the 3D positions are stored in memory. The track manager may also manage the feature list database utilizing input from the depth processor at a base frame rate and from the image processor at an image rate.

At step 1214, a filter on the moving vehicle utilizes the 3D coordinates of each of the one or more new features to form residuals, At step 1216, a state manager on the moving vehicle constructs, based on the feature list database, a filter state vector (e.g., an extended Kalman filter (EKF)) with fifteen (15) error states propagated at an inertial measurement unit (IMU) rate of an IMU of the moving vehicle, and six (6) additional error states corresponding to clones of pose states at a time of the new base frame, wherein the 21 error states are independent of a number of cameras.

As described above, the state manager may construct the filter state vector as:

$$X = [x_I^T, x_V^T]^T, \text{ where}$$
$$x = [p^T, v^T, q^T, b_g^T, b_a^T]^T \text{ are the 15 error states propagated at IMU rate with}$$

$$\dot{p} = v$$

$$\dot{v} = C(q)^T(a_{IMU} - b_a - n_a) + g$$

$$\dot{q} = \frac{1}{2}\Omega(\omega_{IMU} - b_g - n_g)$$

$$\dot{b}_g = n_{b_g}$$

$$\dot{b}_a = n_{b_a}$$

wherein p, v, and q comprise a position, a velocity and an orientation quaternion with respect to a terrain frame, $b_g$ and $b_a$ comprise IMU biases, $\Omega$ comprises a cross product matrix of a rate vector, and $x_V$ comprise the 6 error states updated at image rate. Further, the 21 error states are independent of a number of features being tracked.

At step 1218, a visual updater on the moving vehicle utilizes the 2D coordinates of each of the one or more new 2D features to update the filter state vector.

At step 1220, the filter utilizes the residuals to correct an inertial error drift of the IMU. In one or more embodiments, the (state estimation) filter may use an EKF filter or any different filtering method such as an equivariant filter, an unscented Kalman filter, etc.

In one or more embodiments steps 1202-1220 are used to navigate the moving vehicle (i.e., based on the image processor, the depth processor, the track manager, the state manager, the visual updater, and the filter).

Further to the above, it may be noted that the method does not require knowledge of a 3D model of terrain nor a pose of the moving vehicle before the moving vehicle navigates the terrain. In addition, the method does not require an altimeter or initial attitude knowledge.

Further to the above, embodiments of the invention may apply certain heuristics when a base frame is generated to switch to a different camera set and apply different calibration. In other words, a switching mechanism may be utilized that is based on a heuristic to incorporate a second camera that can be switched out for the first camera. Alternatively, all of the cameras can be used simultaneously at the same time.

Hardware Environment

Figure 13:
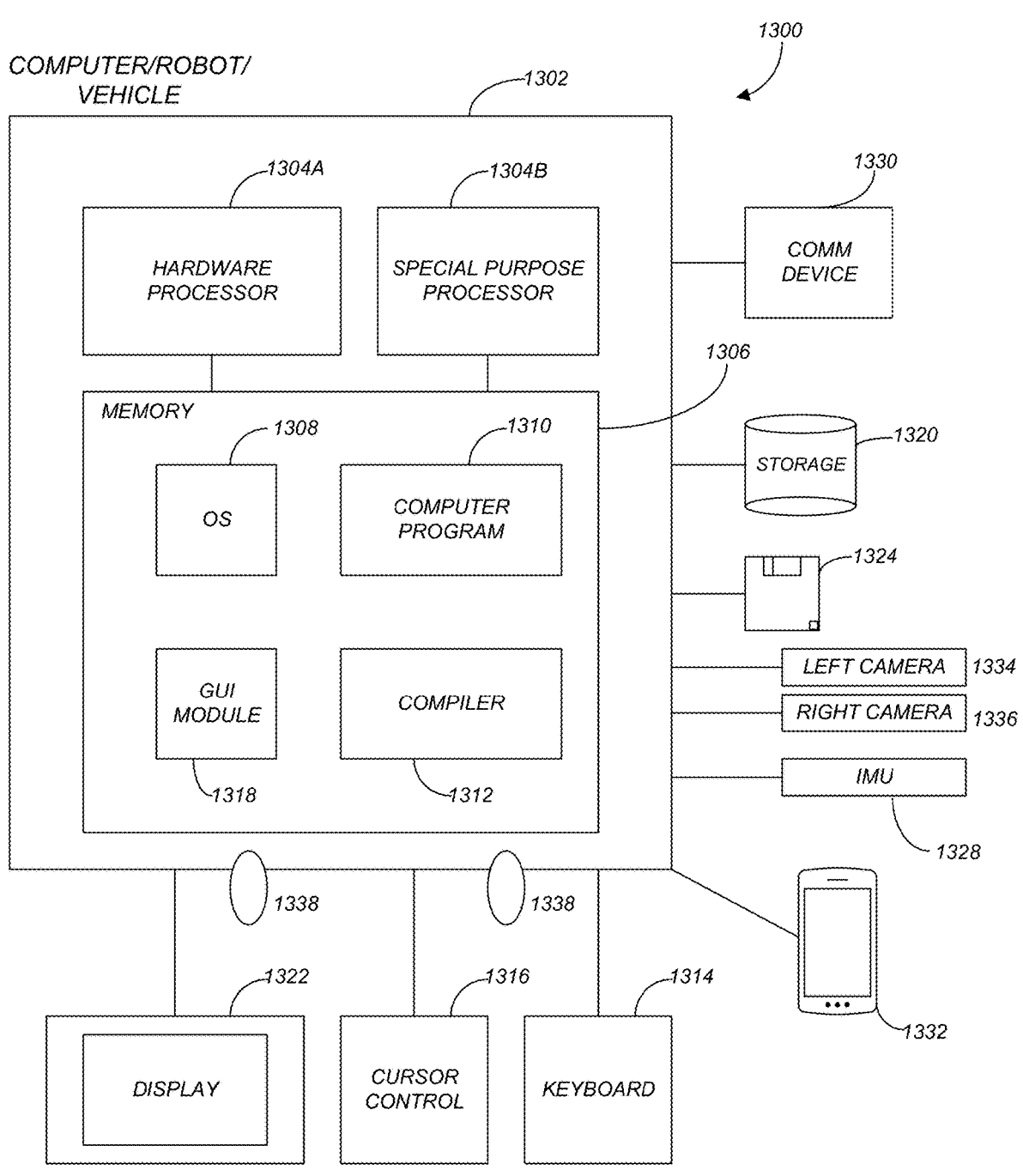
FIG. 13 is an exemplary hardware and software environment used to implement one or more embodiments of the invention.

FIG. 13 is an exemplary hardware and software environment 1300 (referred to as a computer-implemented system and/or computer-implemented method) used to implement one or more embodiments of the invention. The hardware and software environment includes a computer 1302 and may include peripherals. Computer 1302 may be installed on or may be integrated into a robot, a moving vehicle, a user/client computer, server computer, a database computer, etc. The computer 1302 comprises a hardware processor 1304A and/or a special purpose hardware processor 1304B (hereinafter alternatively collectively referred to as processor 1304) and a memory 1306, such as random access memory (RAM). The computer 1302 may be coupled to, and/or integrated with, other devices, including input/output (I/O) devices such as a keyboard 1314, and a cursor control device 1316 (e.g., a mouse, a pointing device, pen and tablet, touch screen, multi-touch device, etc.). Further, robot/vehicle 1302 may include a left camera 1334, a right camera 1336, and an IMU 1328. In addition, robot/vehicle 1302 may have wheels 1338 or other mechanisms that enable it to autonomously move (e.g., as controlled by processors 1304).

In one embodiment, the computer 1302 operates by the hardware processor 1304A performing instructions defined by the computer program 1310 (e.g., a computer-aided design [CAD] application) under control of an operating system 1308. The computer program 1310 and/or the operating system 1308 may be stored in the memory 1306 and may interface with the user and/or other devices to accept input and commands and, based on such input and commands and the instructions defined by the computer program 1310 and operating system 1308, to provide output and results.

Output/results may be presented on the display 1322 or provided to another device for presentation or further processing or action. In one embodiment, the display 1322 comprises a liquid crystal display (LCD) having a plurality of separately addressable liquid crystals. Alternatively, the display 1322 may comprise a light emitting diode (LED) display having clusters of red, green and blue diodes driven together to form full-color pixels. Each liquid crystal or pixel of the display 1322 changes to an opaque or translucent state to form a part of the image on the display in response to the data or information generated by the processor 1304 from the application of the instructions of the computer program 1310 and/or operating system 1308 to the input and commands. The image may be provided through a graphical user interface (GUI) module 1318. Although the GUI module 1318 is depicted as a separate module, the instructions performing the GUI functions can be resident or distributed in the operating system 1308, the computer program 1310, or implemented with special purpose memory and processors.

In one or more embodiments, the display 1322 is integrated with/into the computer 1302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1302 according to the computer program 1310 instructions may be implemented in a special purpose processor 1304B. In this embodiment, some or all of the computer program 1310 instructions may be implemented via firmware instructions stored in a read only memory (ROM), a programmable read only memory (PROM) or flash memory within the special purpose processor 1304B or in memory 1306. The special purpose processor 1304B may also be hardwired through circuit design to perform some or all of the operations to implement the present invention. Further, the special purpose processor 1304B may be a hybrid processor, which includes dedicated circuitry for performing a subset of functions, and other circuits for performing more general functions such as responding to computer program 1310 instructions. In one embodiment, the special purpose processor 1304B is an application specific integrated circuit (ASIC).

The computer 1302 may also implement a compiler 1312 that allows an application or computer program 1310 written in a programming language such as C, C++, Assembly, SQL, PYTHON, PROLOG, MATLAB, RUBY, RAILS, HASKELL, or other language to be translated into processor 1304 readable code. Alternatively, the compiler 1312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1310 accesses and manipulates data accepted from I/O devices and stored in the memory 1306 of the computer 1302 using the relationships and logic that were generated using the compiler 1312.

The computer 1302 also optionally comprises an external communication device such as a modem, satellite link, Ethernet card, or other device for accepting input from, and providing output to, other computers 1302.

In one embodiment, instructions implementing the operating system 1308, the computer program 1310, and the compiler 1312 are tangibly embodied in a non-transitory computer-readable medium, e.g., data storage device 1320, which could include one or more fixed or removable data storage devices, such as a zip drive, floppy disc drive 1324, hard drive, CD-ROM drive, tape drive, etc. Further, the operating system 1308 and the computer program 1310 are comprised of computer program 1310 instructions which, when accessed, read and executed by the computer 1302, cause the computer 1302 to perform the steps necessary to implement and/or use the present invention or to load the program of instructions into a memory 1306, thus creating a special purpose data structure causing the computer 1302 to operate as a specially programmed computer executing the method steps described herein. Computer program 1310 and/or operating instructions may also be tangibly embodied in memory 1306 and/or data communications devices 1330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1302.

Conclusion

This concludes the description of the preferred embodiment of the invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Bayard 2019] Bayard, David S, Conway, Dylan, Brockers, Roland, Delaune, Jeff, Matthies, Larry, Grip, Håvard, Merewether, Gene, Brown, Travis, and San Martin, Alejandro. "Vision-Based Navigation for the NASA Mars Helicopter." AIAA Scitech 2019 Form (2019). 10.2514/6.2019-1411.

[Delaune 2020] Jeff Delaune, David S. Bayard, and Roland Brockers, "xVIO: A Range-Visual-Inertial Odometry Framework", arXiv:2010.06677 (2020).

What is claimed is:

1. A method for vision-based navigation on a moving vehicle, comprising:

(a) an image processor on the moving vehicle performing steps of:

(i) receiving multiple reference images with associated depth information sequentially from one or more cameras of the moving vehicle, wherein:

(1) each of the multiple reference images comprises a base frame or a search frame;

(ii) detecting one or more two-dimensional (2D) features in a first base frame;

(iii) triggering a new base frame of the multiple reference images when:

(1) a number of the one or more 2D features falls under a number threshold; or (2) a spatial distribution of the one or more 2D features falls under a spatial distribution threshold;

(3) upon triggering the new base frame:

(1) repeating the detecting to detect one or more new 2D features;

(2) sending 2D coordinates of the one or more new 2D features to a depth processor;

(iv) tracking the one or more new 2D features in one or more subsequent search frames;

(b) a depth processor on the moving vehicle performing steps of:

(i) reconstructing the depth information and a 3D position of each of the one or more new 2D features;

(c) a track manager on the moving vehicle performing steps of:

(i) managing a feature list database wherein the 2D coordinates of each of the one or more new 2D features is associated with the 3D position of that feature based on the depth, wherein the 3D positions are stored in memory;

(d) a state manager on the moving vehicle performing steps of:

(i) constructing, based on the feature list database, a filter state vector with fifteen (15) error states propagated at an inertial measurement unit (IMU) rate of an IMU of the moving vehicle, and six (6) additional error states corresponding to clones of pose states at a time of the new base frame, wherein the 21 error states are independent of a number of cameras;

(e) a visual updater on the moving vehicle performing steps of:

(i) utilizing the 2D coordinates of each of the one or more new 2D features to update the filter state vector; and (f) a filter on the moving vehicle performing steps of:

(i) utilizing the 3D coordinates of each of the one or more new features to form residuals; and (ii) utilizing the residuals to correct an inertial error drift of the IMU.

2. The method of claim 1, wherein:

each of the multiple reference images with associated depth information is received from one or more camera pairs.

3. The method of claim 1, further comprising:

navigating the moving vehicle based on the image processor, the depth processor, the track manager, the state manager, the visual updater, and the filter.

4. The method of claim 1, wherein:

the method does not require knowledge of a 3D model of terrain nor a pose of the moving vehicle before the moving vehicle navigates the terrain.

5. The method of claim 1, further comprising:

determining that the depth information can be calculated for a different camera at base frame generation; and switching one of the multiple reference images to a reference image from the different camera prior to detecting the one or more 2D features in a next base frame.

6. The method of claim 1, wherein:

the track manager manages the feature list database utilizing input from the depth processor at a base frame rate and from the image processor at an image rate.

7. The method of claim 1, wherein:

the state manager constructs the filter state vector as:

$x = [x_I^T, x_V^T]^T$, where $x_I = [p^T, v^T, q^T, b_g^T, b_a^T]^T$ are the 15 error states propagated at IMU rate with $$\dot{p} = v$$

$$\dot{v} = C(q)^T (a_{IMU} - b_a - n_a) + g$$

$$\dot{q} = \frac{1}{2}\Omega(\omega_{IMU} - b_g - n_g)$$

$$\dot{b}_g = n_{b_g}$$

$$\dot{b}_a = n_{b_a}$$

wherein p, v, and q comprise a position, a velocity and an orientation quaternion with respect to a terrain frame, $b_g$ and $b_a$ comprise IMU biases, $\Omega$ comprises a cross product matrix of a rate vector, and $x_V$ comprise the 6 error states updated at image rate.

8. The method of claim 1, wherein:
the 21 error states are independent of a number of features being tracked.

9. The method of claim 1, wherein:
the depth processor utilizes a machine learning based ranging algorithm to calculate the depth for each of the one or more new 2D features.

10. A moving vehicle comprising:
(a) an image processor configured to:
   (i) receive multiple reference images with associated depth information sequentially from one or more cameras of the moving vehicle, wherein:
      (1) each of the multiple reference images comprises a base frame or a search frame;
   (ii) detect one or more two-dimensional (2D) features in a first base frame;
   (iii) trigger a new base frame of the multiple reference images when:
      (1) a number of the one or more 2D features falls under a number threshold; or
      (2) a spatial distribution of the one or more 2D features falls under a spatial distribution threshold;
      (3) upon triggering the new base frame:
         (1) repeating the detecting to detect one or more new 2D features;
         (2) sending 2D coordinates of the one or more new 2D features to a depth processor;
   (iv) track the one or more new 2D features in one or more subsequent search frames;
(b) a depth processor configured to:
   (i) reconstructing the depth information and a 3D position of each of the one or more new 2D features;
(c) a track manager configured to:
   (i) manage a feature list database wherein the 2D coordinates of each of the one or more new 2D features is associated with the 3D position of that feature based on the depth, wherein the 3D positions are stored in memory;
(d) a state manager configured to:
   (i) construct, based on the feature list database, a filter state vector with fifteen (15) error states propagated at an inertial measurement unit (IMU) rate of an IMU of the moving vehicle, and six (6) additional error states corresponding to clones of pose states at a time of the new base frame, wherein the 21 error states are independent of a number of cameras;
(e) a visual updater configured to:
   (i) utilize the 2D coordinates of each of the one or more new 2D features to update the filter state vector; and
(f) a filter configured to:
   (i) utilize the 3D coordinates of each of the one or more new features to form residuals; and
   (ii) utilize the residuals to correct an inertial error drift of the IMU.

11. The moving vehicle of claim 10, wherein:
each of the multiple reference images with associated depth information is received from one or more camera pairs.

12. The moving vehicle of claim 10, configured to:
navigate based on the image processor, the depth processor, the track manager, the state manager, the visual updater, and the filter.

13. The moving vehicle of claim 10, wherein:
knowledge of a 3D model of terrain or a pose of the moving vehicle before the moving vehicle navigates the terrain is not required.

14. The moving vehicle of claim 10, wherein the image processor:
determines that the depth can be calculated for a different camera at base frame generation; and
switches one of the multiple reference images to the different camera prior to detecting a next base frame.

15. The moving vehicle of claim 10, wherein:
the track manager manages the feature list database utilizing input from the depth processor at a base frame rate and from the image processor at an image rate.

16. The moving vehicle of claim 10, wherein:
the state manager constructs the filter state vector as:
   $x=[x_I^T, x_V^T]^T$, where
   $x=[p^T, v^T, q^T, b_g^T, b_a^T]^T$ are the 15 error states propagated at IMU rate with $$\dot{p} = v$$

$$\dot{v} = C(q)^T (a_{IMU} - b_a - n_a) + g$$

$$\dot{q} = \frac{1}{2}\Omega(\omega_{IMU} - b_g - n_g)$$

$$\dot{b}_g = n_{b_g}$$

$$\dot{b}_a = n_{b_a}$$

wherein p, v, and q comprise a position, a velocity and an orientation quaternion with respect to a terrain frame, $b_g$ and $b_a$ comprise IMU biases, $\Omega$ comprises a cross product matrix of a rate vector, and $x_V$ comprise the 6 error states updated at image rate.

17. The moving vehicle of claim 10, wherein:
the 21 error states are independent of a number of features being tracked.

18. The moving vehicle of claim 10, wherein:
the depth processor utilizes a machine learning based ranging algorithm to calculate the depth for each of the one or more new 2D features.

\* \* \* \* \*